United States Patent [19]

Tanaka et al.

[11] Patent Number: 4,613,007

[45] Date of Patent: Sep. 23, 1986

[54] MULTI-FUNCTION STARTER DEVICE

[75] Inventors: Toshinori Tanaka; Akira Morishita, both of Himeji, Japan

[73] Assignee: Mitsubishi Denki Kabushiki Kaisha, Tokyo, Japan

[21] Appl. No.: 662,157

[22] Filed: Oct. 18, 1984

[30] Foreign Application Priority Data

Oct. 20, 1983 [JP] Japan .......................... 58-163890[U]

[51] Int. Cl.[4] .................................................. H02J 1/00

[52] U.S. Cl. ................................ 180/89.15; 290/1 R; 307/10 R

[58] Field of Search ...................... 307/10 R, 9, 77, 51, 307/60; 180/89.15; 290/1 R, 48

[56] References Cited

U.S. PATENT DOCUMENTS 4,406,951 9/1983 Inoue ............................... 307/10 R

FOREIGN PATENT DOCUMENTS 49-44809 11/1974 Japan .
52-37721 8/1977 Japan .
57-183526 11/1982 Japan .
58-192965 10/1983 Japan .
1014787 12/1965 United Kingdom .

OTHER PUBLICATIONS

Patents Abstracts of Japan, vol. 7, No. 29(M-191) (1174), Feb. 5, 1983.

Patents Abstracts of Japan, vol. 8, No. 37(M-277) (1474), Feb. 17, 1984.

*Primary Examiner*—Richard A. Bertsch
*Attorney, Agent, or Firm*—Oblon, Fisher, Spivak, McClelland & Maier

[57] ABSTRACT

A multi-function starter device comprises a starter motor mounted on an engine, an oil pump connected to the starter motor to derive an auxiliary device, wherein the oil pump is always connected to the starter motor to be rotated and an oil pressure switching valve to be operated by a car-driver is provided in a pipe at the discharge side of the oil pump, and wherein the oil pressure discharging valve is connected to the side of an oil refluxing path at the time of starting the engine and is switched to a pipe communicated with an actuator at the time of driving the auxiliary device.

5 Claims, 3 Drawing Figures

MULTI-FUNCTION STARTER DEVICE

The present invention relates to an improvement in a multi-function starter device having an additional load.

As a multi-function starter device of this kind, there has been proposed one as shown in FIG. 1. In FIG. 1, a reference numeral 1 designates a starter motor, a numeral 2 designates an oil pump connected to a rotary shaft of the starter motor through an electromagnetic clutch 3, a numeral 4 designates an oil cylinder for cab-tilt operation (tilt of the cabin) of an automobile, a numeral 5 designates an oil tank to which oil pressure pipes 6, 7 are connected and a numeral 8 designates an oil pipe connected between the oil pump 2 and the oil cylinder 4.

In the multi-function starter device constructed as above-mentioned, only the starter motor 1 is actuated by current conduction without actuation of the electromagnetic clutch 3 at the time of starting the engine and a pinion (not shown) is interlocked with the engine to be driven. At this moment, the oil pump 2 is not driven because the electromagnetic clutch 3 is not actuated. Upon actuation of the electromagnetic clutch 3, the oil pump 2 is connected to the starter motor to be driven. As a result, pressure oil is supplied to the oil cylinder 4 and the oil cylinder 4 is actuated. In this case, the pinion (not shown) connected to the starter motor 1 does not interlock with a ring gear (not shown) of the engine.

The conventional device having the construction described above requies provision of an electromagnetic clutch, on account of which the device is complicated and expensive because a complicated circuit is required as well as use of an expensive electromagnetic clutch.

It is an object of the present invention to eliminate the disadvantage of the conventional device and to provide a multi-function starter device being highly reliable and simple in structure by keeping connection of a starter motor to an oil pump to transmit a rotational force and by switching an oil pressure circuit by an oil pressure switching valve operated in response to an operation lever.

The present invention is to provide a multi-function starter device comprising a starter motor mounted on an engine, an oil pump connected to the starter motor to drive an auxiliary device, characterized in that the oil pump is always connected to the starter motor to be rotated and an oil pressure switching valve to be manually operated is provided in a pipe at the discharge side of the oil pump, wherein the oil pressure discharging valve is connected to the side of an oil refluxing path at the time other than driving the auxiliary device and is switched to a pipe communicated with an actuator at the time of driving the auxiliary device.

The foregoing object, other objects as well as specific construction and operation of the multi-function starter device according to the present invention will become more apparent and understandable from the following description of it, when read in conjunction with the accompanying drawing.

An embodiment of the multi-function starter device of the present invention will be described with reference to drawing.

Figure 2:
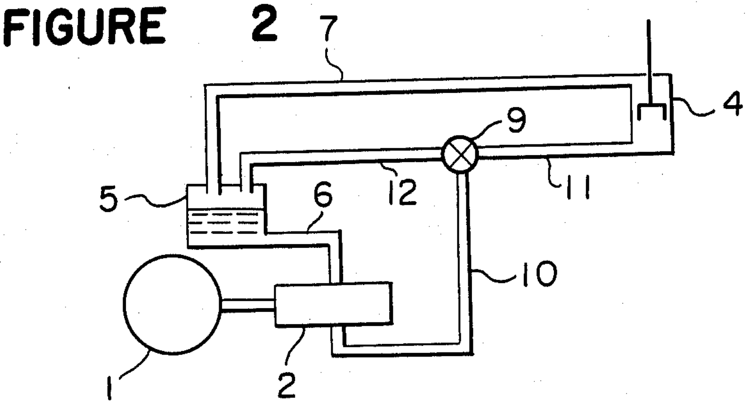
FIG. 2 is a diagram of an embodiment of the multi-function starter device of the present invention.

In FIG. 2, an oil pressure switching valve 9 switches a pipe 10 connected to an oil pump 2 either to a pipe 11 connected to an oil cylinder 4 or to a pipe 12 connected to an oil tank 5. Pressure oil fed to the oil cylinder 4 is returned to the oil tank 5 through a pipe 7, while the pressure oil passed to the pipe 12 is directly returned to the oil tank 5. The oil pressure switching valve 9 is responsive to an operation lever (not shown) for cab-tilt operation for an automobile. The oil pump 2 is directly connected to a starter motor to be driven.

Figure 3:
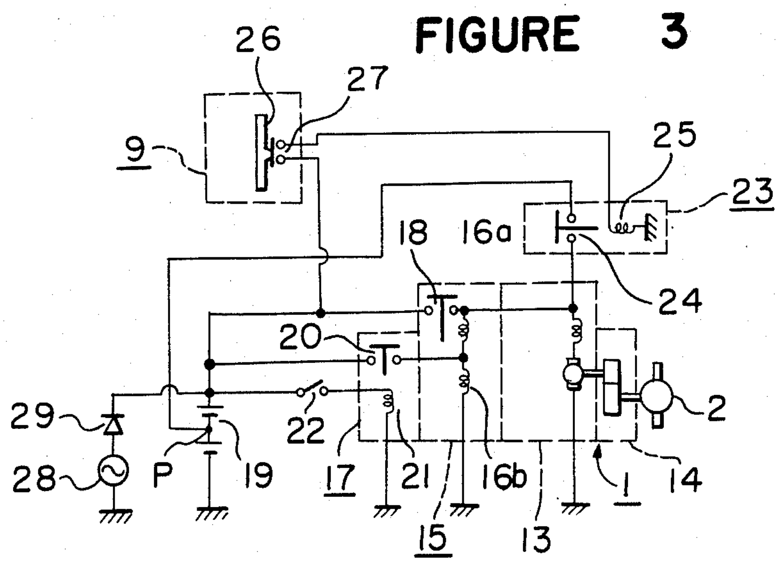
FIG. 3 is a circuit diagram of the device shown in FIG. 2.

In FIG. 3, a reference numeral 13 designates a d.c. motor, a numeral 14 designates a reduction gear having an output shaft to which the oil pump 2 is connected, a numeral 15 designates an electromagnetic switch including coils 16*a*, 16*b* which are controlled for actuation by an auxiliary switch 17, a numeral 18 designates a normally opening contact connected between a battery 19 and a d.c. motor 13, a numeral 20 designates a normally opening contact of the auxiliary switch 17, and a numeral 21 designates a coil for actuating the contact 20 and connected to the battery 19 through a key switch 22. A numeral 23 designates a control relay which is constituted by a normally opening contact 24 and a coil 25. The normally opening contact 24 is connected between the d.c. motor 13 and an intermediate voltage point P of the battery 19 and the coil 25 is connected to the battery 19 through a normally opening contact 27 which operates in response to a lever 26 of the oil pressure switching valve 9. A numeral 28 designates an alternator and a numeral 29 designates a diode.

Figure 1:
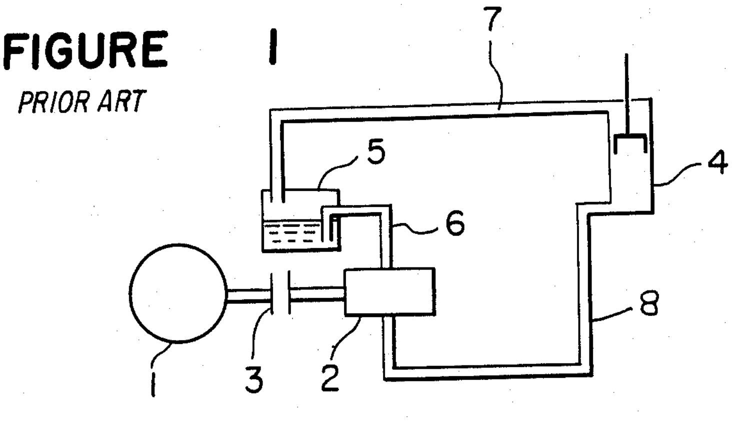
FIGURE 1 PRIOR ART
FIG. 1 is a diagram of a conventional multi-function starter device.

The other structural elements shown in FIGS. 2 and 3 are same as those in FIG. 1 and therefore the same reference numerals are applied to the corresponding parts to omit the description.

The operation of the multi-function starter device having the construction as above-mentioned will be described.

Starting of the engine is effected by closing the key switch 22. The operation of the key switch 22 causes actuation of the coil 21 of the auxiliary switch 17 thereby closing the normally opening contact 20 and at the same time, the coils 16*a*, 16*b* of the electromagnetic switch 15 is actuated by current conduction thereby closing the normally opening contact 18. As a result, a pinion (not shown) is moved to be interlocked with a ring gear (not shown) of the engine. At the same time, the d.c. motor 13 is actuated for revolution and the rotational force of the motor is transmitted to the ring gear through the pinion to start the engine. At this moment, although the oil pump 2 is driven through the reduction gear 14, the oil presure switching valve 9 is not yet operated on account of which the pipe 10 is communicated with the pipe 12 so that working oil from the oil pump 2 is directly refluxed to the oil tank 5. Accordingly, work to be done by the oil pump 2 is nearly zero and energy produced by the d.c. motor 13 can be used for starting the engine.

In the next place, the operation of an auxiliary device will be described.

Under the condition of the key switch being kept opened, the oil pressure switching valve 9 is manually operated to communicate the pipe 10 with the pipe 11. The normally opening contact 24 installed in the oil pressure switching valve 9 is closed whereby the coil 25 of the relay 23 is actuated by conduction of current to close the normally opening contact 24 and voltage at the intermediate tap of the battery is applied to the d.c. motor 13. Then, the d.c. motor 13 is actuated for revolution by a low electric power, with the consequence that the oil pump 2 is driven and the working oil flows in a circuit consisting of the oil tank 5 - the pipe 6 - the oil pump 2 - the pipe 10 - the oil pressure switching valve 9 - the pipe 11 - the oil cylinder 4 (a piping circuit for actuator) thereby operating the oil cylinder 4 to perform cab-tilt operation.

When the oil pressure switching valve 9 is operated to be returned to an original position to thereby open the normally opening contact 27, the relay 23 is deenergized to stop the d.c. motor 13 and at the same time, the pipe 10 is communicated with the pipe 12; thus the opeation of the entire device ceases.

Incidentally, when the lever 26 is brought to a neutral position in the returning operation of the oil pressure switching valve 9, the pipe 11 and the pipe 12 constitute short circuit whereby the oil cylinder 4, i.e. the cab-tilt is returned.

Thus, controlled unload operation can be carried out by a car-driver (operator) without necessity of a special control device and reliability to the operation of the device increases because a burden due to the oil pump 2 is not substantially imparted to the d.c. motor when it actuates the engine.

In the foregoing, description has been made as to use of the oil cylinder 4 as an oil pressure actuator device. It is, however, possible to use another oil pressure actuator device such as a vane type actuator.

As described above, the multi-function starter of the present invention is constructed in such a manner that an oil pump is always connected to a starter motor to be driven and an oil presure circuit is switched by a hand-operated oil pressure switching valve provided in the oil pressure circuit at the discharge side of the oil pump. Accordingly, the device can be easily and correctly controlled. Further, the construction of the device is simple and economical.

We claim:

1. A multi-function starter device comprising a starter motor mounted on an engine, an oil pump connected to said starter motor to drive an auxiliary device, characterized in that said oil pump is always connected to said starter motor to be rotated and an oil pressure switching valve to be manually operated is provided in a pipe at the discharge side of said oil pump, wherein said oil pressure discharging valve is connected to the side of an oil refluxing path at the time other than driving of said auxiliary device and upon shutdown of said device, and is switched to a pipe communicated with an actuator at the time of driving said auxiliry device and whereby when said switching valve is placed in a neutral position oil pressure is reduced in said auxiliary device.

2. The multi-function starter device according to claim 1, wherein said actuator is constituted by an oil cylinder for cab-tilt operation for an automobile.

3. The multi-function starter device according to claim 1, wherein said oil pressure switching valve is provided with a normally opening contact and said starter motor is connected to a power source by closing said normally opening contact at the time of switching said pipe communicated with said actuator.

4. The multi-function starter device according to claim 1, wherein an oil pressure circuit is formed by a series connection of said oil pressure switching valve, said oil pump and an oil tank and a parallel connection consisting of a directly refluxing path and a path including said actuator, said parallel connection of paths being connected between said oil pressure switching valve and said oil tank.

5. The multi-function starter device according to claim 1, wherein said starter motor is connected to an intermediate tap of said power source while a key switch is opened.

* * * * *